United States Patent [19]

Haugen

[11] 4,022,333

[45] May 10, 1977

[54] BALE STACKING APPARATUS

[75] Inventor: Gordon M. Haugen, Cornelius, Oreg.

[73] Assignee: J. A. Freeman & Son, Inc., Portland, Oreg.

[22] Filed: June 26, 1975

[21] Appl. No.: 590,434

[52] U.S. Cl. .............................. 214/6 B; 198/429; 198/466; 214/6 P
[51] Int. Cl.² ......................................... B65G 57/32
[58] Field of Search ............. 214/6 B, 6 P; 198/21, 198/429, 466

[56] References Cited

UNITED STATES PATENTS

| | | | |
|---|---|---|---|
| 2,785,785 | 3/1957 | Macaluso | 198/21 |
| 3,163,302 | 12/1964 | Pridgeon | 214/6 B |
| 3,549,023 | 12/1970 | Backman | 214/6 B |
| 3,642,111 | 2/1972 | Reimers et al. | 198/21 |
| 3,667,628 | 6/1972 | Gabler et al. | 214/6 P X |
| 3,690,473 | 9/1972 | Miguel | 214/6 B |
| 3,920,133 | 11/1975 | Butler et al. | 214/6 B |

FOREIGN PATENTS OR APPLICATIONS 641,978 2/1937 Germany .............................. 198/21

Primary Examiner—L. J. Paperner
Attorney, Agent, or Firm—Eugene M. Eckelman

[57] ABSTRACT

Switches in an electrical control circuit are disposed in the path of bales being loaded by a pair of conveyors, and these switches control the operation of the conveyors such that bales are loaded on a platform and selectively positioned with the leading end of a first bale flush with one end of the platform and the trailing end of a following bale flush with the other end of the platform. Relays and a solenoid-operated valve are also utilized in the electrical control circuit to control operation of the conveyors as well as a pusher mechanism that moves bales in a row laterally when a row has been loaded with their opposite ends flush with the ends of the platform. Since the ends of the bales are flush with the ends of the platform, a stack of bales can be formed with even ends.

5 Claims, 5 Drawing Figures

BALE STACKING APPARATUS

BACKGROUND OF THE INVENTION

This invention relates to new and useful improvements in bale stacking apparatuses.

Bale stacking apparatuses have heretofore been provided which have a bale handling platform on which bales are stacked into tiers and positioned in the various tiers in a self-locking transportable stack. Such an apparatus is shown in U.S. Pat. No. 3,690,473 to Miguel. This type of apparatus utilizes a plunger for laterally compressing the bales together in the formation of the stack whereupon two sides of the stack are substantially straight and even walled. However, the other two sides of the stack, comprising those sides at right angles to the direction at which the bales are fed to the bale receiving and handling carriage are uneven because the length of some of the tiers in the stack depends upon the length of the bales and the bales usually have variable lengths. Thus, stacks of bales heretofore formed have uneven surfaces at two ends and this has the disadvantage that bales in such ends may not be locked in place and may fall out.

SUMMARY OF THE INVENTION

According to the present invention and forming a primary objective thereof, a bale stacking apparatus is provided that selectively positions the bales as they are fed onto a platform such that the ends of the bales are all flush with each other to provide even end surfaces on a stack to be formed for positive interlocking attachment of bales in said stack. To accomplish this objective, control means are associated with loading conveyors in a control arrangement wherein the ends of bales in all rows being formed are in the same vertical plane at the ends of a platform regardless of the length of the bale. The control means also provide for the operation of a plunger mechanism that moves the bales laterally after proper end positioning of said bales. The control means employed also have the objective of providing a simplified and economical system for accomplishing the even end positioning of bales in a stack.

The invention will be better understood and additional objects and advantages will become apparent from the following description taken in connection with the accompanying drawings.

BRIEF DESCRIPTION OF THE DRAWINGS

FIG. 4 is an electrical and piping diagram of the present system; and

DETAILED DESCRIPTION OF A PREFERRED EMBODIMENT

Figure 1:
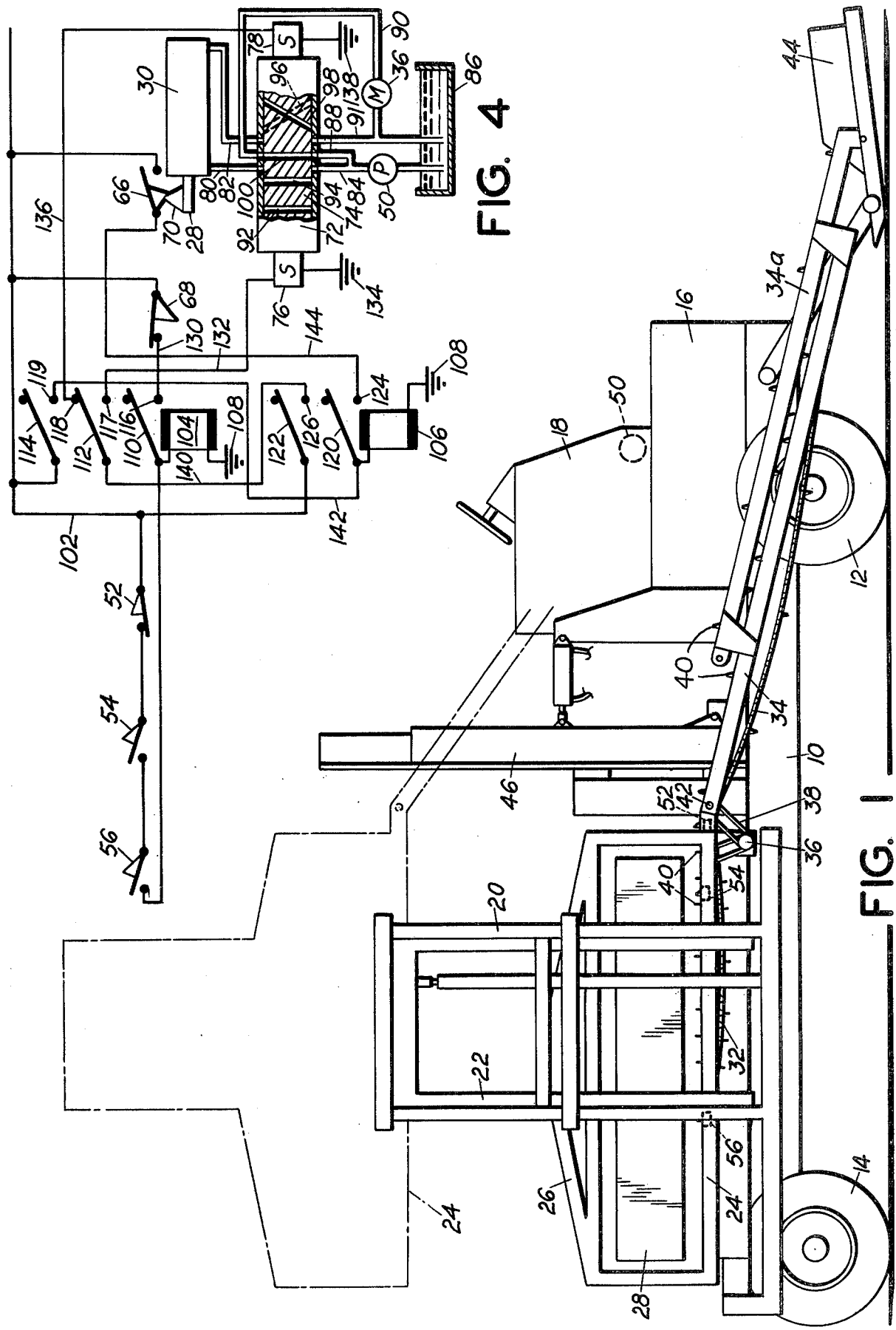
FIG. 1 is a side elevational view, somewhat diagrammatic, of a bale stacking apparatus of the instant invention.

With reference first to FIG. 1, the bale stacking apparatus comprises an elongated main frame 10 having front steerable wheels 12 and rear wheels 14. The apparatus has a power unit 16 as well as the usual operator's cab 18.

Figure 2:
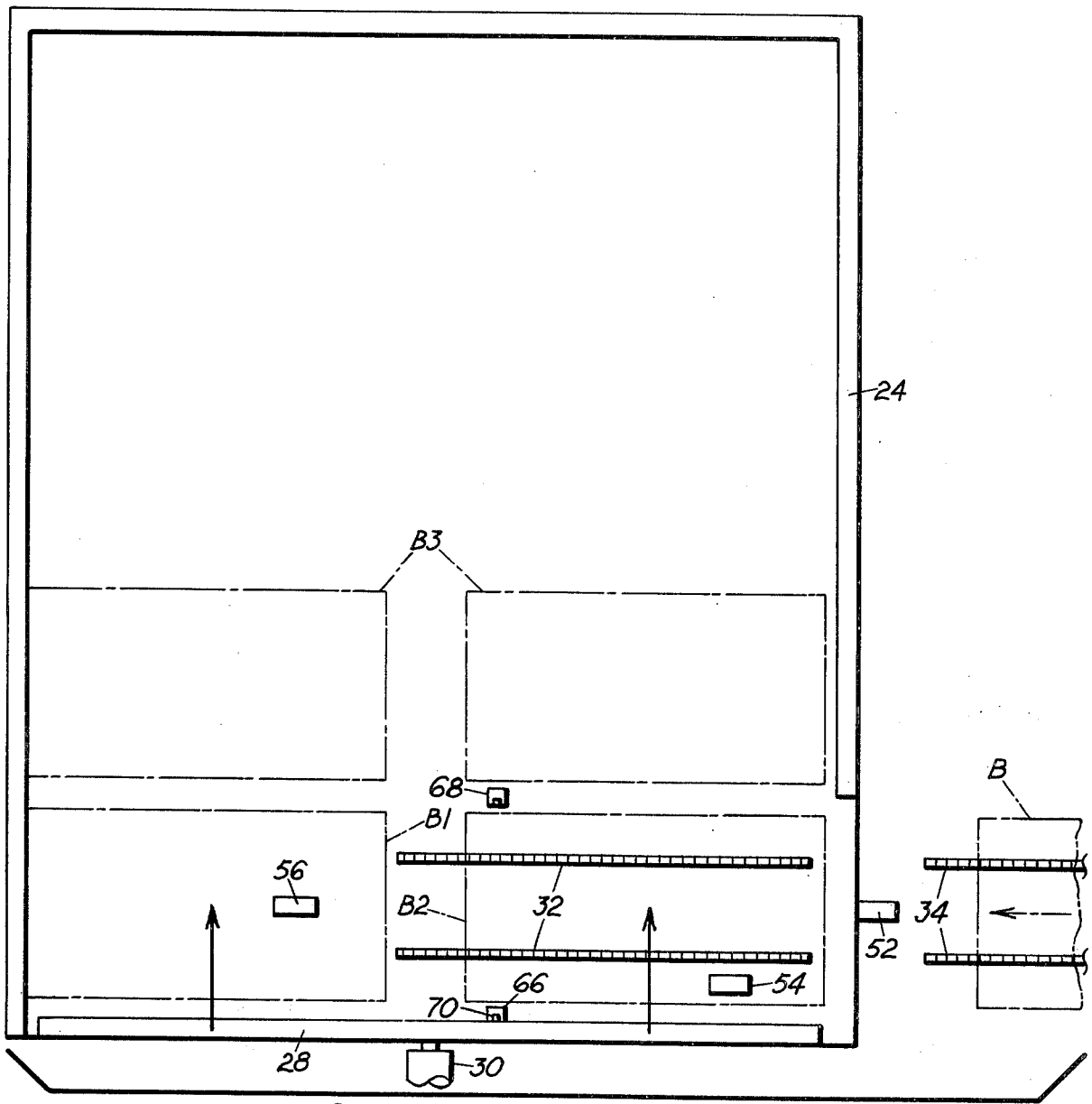
FIG. 2 is a diagrammatic top plan view of the apparatus.
Figure 5:
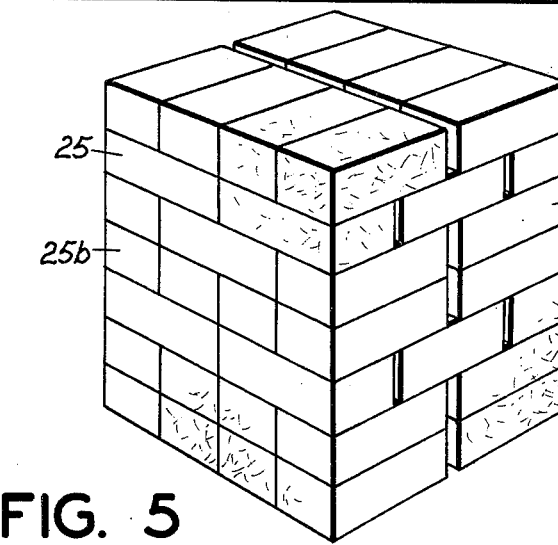
FIG. 5 is an elevational view of a stack of bales, the front and rear thereof having even vertical surfaces as a result of the use of the present apparatus.

Stacking mechanism 20 is supported on the frame 10 and includes a lift frame 22 and a platform 24 for forming a stack 25, FIG. 5, having a plurality of tiers, some of which are interlocking. The stacking mechanism also includes a pusher frame 26 having a head 28, also seen in FIG. 2, that engages the bales to move them laterally on the platform. As shown in FIG. 2 in diagrammatic relation, the pusher head 28 is operated laterally of the machine by an hydraulic cylinder 30 suitably secured to the vehicle frame.

The apparatus has a pair of conveyors 32 and 34 driven by a common hydraulic motor 36 through a suitable drive connection 38 such as sprocket chains or belts. The conveyors have projecting lugs 40 thereon for engaging the bales and carrying them along. Conveyor 32 is supported on the platform 24 and conveyor 34 has a hinged connection 42 at one of its ends with the platform 24, whereby it is adapted to be carried and inclined upwardly with the platform as the stack is formed, the uppermost position of the platform 24 being shown in broken lines in FIG. 1. The conveyor 34 has an extension 34a providing for length adjustment as it is raised and lowered during the formation of a stack. A bale pickup head 44 is mounted on the front of the conveyor extension 34a and is arranged to direct bales onto the conveyor upon forward movement of the vehicle. The stacking device also has a lifting mechanism 46 for removing a stack from the machine. The apparatus thus far described is conventional and therefore is not fully detailed. It further includes conventional mechanism for forming the tiers in a stack and for positioning the bales in selected tier locking arrangement.

The invention is involved primarily in the control of the conveyors 32 and 34 as well as the pusher head 28 to form a stack having even ends. That is, with reference again to FIG. 5, the bales at the sides 25a of the stack are made even and flush by operation of the pusher head 28 in the formation of the tiers, as will be more apparent hereinafter, but the ends 25b of the stack have heretofore been uneven due to the irregular length of the bales. It is the purpose of the present invention to load bales on the platform so that a stack can be formed with the bales also even and flush at the ends 25b. FIG. 5 shows a stack that has been formed utilizing the present apparatus.

According to the invention, the conveyors 32 and 34 direct the bales endwise onto the platform 24 in a single row adjacent to the pusher head 28, namely in a row made up of two bales as designated by B1 and B2 in FIG. 2, and the arrangement of the control system is preselected in relation to the conveyors 32 and 34 to position the bales such that they will be even and flush at the ends. Power for operating the hydraulic cylinder 30 and the conveyor motor 36 is provided by a continuously operative pump 50 driven by the power unit 16.

Figure 3:
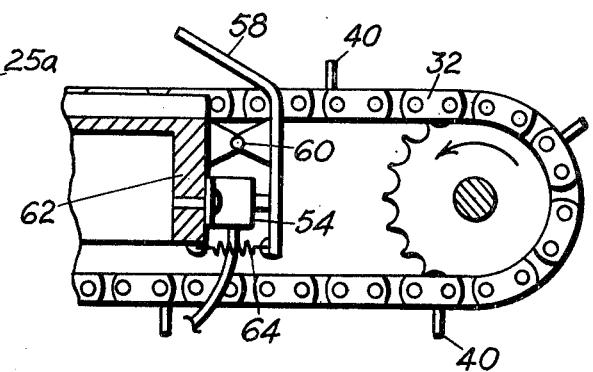
FIG. 3 is a fragmentary sectional view of a conveyor portion of the apparatus of FIG. 1 and showing a portion of control means combined therewith.

With particular reference to FIGS. 1, 2 and 4, three selectively located switches 52, 54 and 56 are utilized. Switch 52 is located adjacent the rear of conveyor 34 and switch 54 is located intermediate the ends of conveyor 32. Switch 56 is located on the machine beyond the conveyor 32. The construction of the switches is conventional and may all for example be of the structure illustrated in FIG. 3 which details the structure of switch 54. Such switch has an arm 58 supported by a pivot connection 60 on a bracket 62 attached to the platform in a suitable manner, and this arm is held in a closed position of the switch by a tension spring 64. Switch 52 is a normally closed switch and switches 54 and 56 are normally open switches. The normal or rest position is shown in FIG. 4.

The system also includes a pair of limit switches 66 and 68, FIGS. 2 and 4, suitably mounted on the platform 24 and arranged for engagement by an actuating finger 70 on the pusher head 28. Switches 66 and 68 are normally closed switches.

With reference to FIG. 4, a valve 72 controlling operation of the hydraulic cylinder 30 and conveyor motor 36 has a slidable core 74 arranged to be pulled in one direction by a solenoid 76 and arranged to be pulled in the opposite direction by a solenoid 78, the core being self-centering to the position shown in FIG. 4. Conduits 80 and 82 lead into valve 72 and are connected to opposite ends of the hydraulic cylinder 30. A conduit 84 which terminates in a reservoir 86 has the pump 50 therein and is connected into valve 72 opposite from conduit 80. A branch conduit 88 leads from conduit 84 on the valve side of the pump 50 and is connected into the valve 72. A conduit 90 having the motor 36 therein leads from the reservoir 86 into the valve opposite conduit 88 and has a branch conduit 91 leading into the valve opposite conduit 82.

The core 74 of the control valve 72 has a plurality of passageways therethrough which control operation of the hydraulic cylinder 30 and the conveyor motor 36, and such passageways comprise a first set of passageways 92 and 94 selectively spaced for communication with conduits 80, 82 and 84, 91 in a left-hand position of the core for operating the piston in the hydraulic cylinder 30 in one direction. The core has a second set of passageways 96 and 98 arranged for communication with the same conduits in the right-hand position of the core for operating the piston in the hydraulic cylinder 30 in the opposite direction.

A passageway 100 is also provided in the core 74 and is arranged in the centered position of the core to provide communication between one end of the conduit 90 and branch conduit 88 to operate the conveyor motor 36. It is thus apparent that the conveyor motor 36 is driven when the core 74 of valve 72 is centered, or in other words, when neither of the solenoids 76 and 78 is energized.

With further reference to FIG. 4, switches 52, 54 and 56 are disposed in series in an infeed wire 102, and the circuitry includes a pair of relays 104 and 106 having ground 108. Relay 104 has switch arms 110, 112 and 114. The first switch arm 110 is arranged for engagement with a contact 116 in the energized condition of the relay. Switch arm 112 is arranged for engagement with a pair of contacts 117 and 118 in the energized and de-energized condition of the relay, respectively. Switch arm 114 is engageable with a contact 119 in the energized condition of the relay.

Relay 106 has two switch arms 120 and 122. Switch arm 120 engages a contact 124 in the energized condition of the relay and switch arm 122 engages a contact 126 in the energized condition of the relay.

A wire 130 extends from contact 116 of relay 104 to switch 68, and the other side of this switch is connected to the infeed wire 102. It is apparent that relay 104 will be energized only when all three switches 52, 54 and 56 are closed, but once it is energized it will remain energized even though one of the switches 52, 54 or 56 is opened since a circuit is established by energization of the relay from infeed line 102, through switch 68, wire 130 and arm 110. Assuming however that one of switches 52, 54 and 56 is open, relay 104 will be deenergized when switch 68 is opened.

A wire 132 extends from contact 117 of the relay 104 to the solenoid 76 having ground 134, and a wire 136 leads from contact 118 of relay 104 to solenoid 78 having ground 138. A wire 140 is connected to the base of arm 112 of relay 104 and extends to contact 126 of the relay 106, and a wire 142 is connected between contact 119 of relay 104 and the base of relay arm 120. A wire 144 is connected between contact 124 of relay 106 and one side of limit switch 66. The other side of switch 66 is connected to infeed line 102.

In the operation of the present system, the pump 50 is driven continuously. The diagram of FIG. 4 shows the system in the initial starting position, namely, switch 52 is closed, switches 54 and 56 are open, relays 104 and 106 are deenergized, limit switch 66 is held open by the actuating finger 70 in the retracted position of the pusher head 28, limit switch 68 is closed, solenoids 76 and 78 are deenergized, and passageway 100 in the core 74 of the control valve 72 communicates with conduits 88 and 90 whereby the pump 50 drives the conveyor motor 36 and the conveyors are in operation.

As the vehicle moves forwardly to pick up the bales, and with reference to FIGS. 1, 2 and 4, a first bale will move up the conveyor 34 and engage and open the switch 52. Since the switches 54 and 56 are still open, no actuation of the relays or solenoids results and the conveyors remain in operation. The conveyor 34 will transfer the bale onto the conveyor 32 whereupon the bale will engage the switch 54 and close the latter switch. For a short time, the one bale will engage both of switches 52 and 54, at which time the switch 52 will be open and the switch 54 will be closed. The control system still is not actuated. The bale is transferred by the conveyor 32 to the left-hand position B1 shown in FIG. 2, and in this position the switch 52 will have returned to its closed position and the switch 54 will be open. The switch 56 will be closed but since the switch 54 has again opened, the control system is not as yet actuated.

As the next bale travels up the conveyor 34, it will open switch 52 and will engage switch 54 to close it, and the position of switch 52 is selectively located with relation to the right hand end of the platform 24 and with relation to the momentum of the bale such that the bale will be stopped precisely with its trailing end at the right-hand side of the platform as illustrated by B2 in FIG. 2. Such operation occurs as follows: As the second bale B2 leaves the switch 52 in its entering movement and allows this switch to close, the switch 54 will have been closed by this same bale, and since the switch 56 is already closed by the first bale B1, all three switches 52, 54 and 56 are closed and a circuit is now established by the coil of relay 104 to energize such relay and move its arms 110, 112 and 114 down against contacts 116, 117 and 119, respectively. Engagement of relay arm 110 with contact 116 arms the circuit through limit switch 68 and thus the relay 104 will remain energized until switch 68 is opened. Energization of relay 104 also moves arm 114 into engagement with contact 119, and this establishes a circuit through wire 142 to the coil of relay 106 for energizing it. This causes engagement of arms 120 and 122 with their respective contacts 124 and 126. Engagement of relay arm 112 with contact 117 energizes solenoid 76 by means of the circuit through arm 122 of relay 106 and this moves the core 74 of valve 72 to a left-hand position wherein the passageway 100 moves out of communication with conduits 88 and 90 to stop the conveyor motor 36 wherein conveyors 32 and 34 will also stop. The passageway 96 now communicates with conduits 80 and 91 and the passageway 98 communicates with the conduits 82 and 84 wherein cylinder 30 drives the plunger 28 outwardly to move the bales laterally, namely, to the position shown in FIG. 2 wherein the bales are designated as B3. As the plunger 28 moves, it allows limit switch 66 to close.

When relay 106 was energized, its arm 120 provided a holding circuit for it through wire 144 and switch 66 to infeed line 102, and such relay after being first energized by the circuit through arm 114 of relay 104 will remain energized until switch 66 is again opened by the return movement of the pusher head even though relay 104 is deenergized.

At the time the pusher head reaches its extended position to deliver the bales to the B3 position, it will engage and open limit switch 68. Since switches 54 and 56 will have opened when the bales B1 and B2 are pushed laterally out of engagement with them, the circuit to the coil of relay 104 will be broken as soon as the switch 68 is opened and this relay will be deenergized. Relay 106 will however remain energized at this time by the circuit through wire 144 and switch 66, and a circuit to solenoid 78 is now established through arm 122, wire 140, arm 112, contact 118, and wire 136 to the solenoid 78. The core of valve 72 thus shifts to the right to establish communication between passageways 92 and 94 and conduits 80, 82 and 84, 91 to drive the piston in cylinder 30 in a retracting movement. When the pusher head 28 is fully retracted, it will open switch 66 and break the circuit to relay 106, thus deenergizing the circuit to solenoid 78 and allowing the core 74 of valve 72 to return and establish communication between passageway 100 and conduits 88 and 90 to once again start the motor 36 and drive the conveyors to initiate the positioning of the next row of bales. Upon positioning of such next row of bales, the same sequence as described above occurs and the pusher head will move each new row laterally, together with the rows already formed, until a complete tier is formed.

Various patterns of bales in each tier and tiers are laid up to form a stack 25 by mechanism not comprising a part of the present invention. Regardless of the pattern of the tiers, however, the two ends of the bale are even because of the end positioning of the bales as they are loaded on the platform in the various rows. The even positioning of the bales provides positive interlocking of the bales in the tiers so that they will not fall out.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:
1. A bale stacking apparatus comprising
   a. a bale receiving platform having opposite ends and sides,
   b. loading means arranged to move bales longitudinally onto said platform,
   c. said platform having a stop at one end and being arranged to receive at least two bales in a row from said loading means,
   d. drive means operating said loading means,
   e. control means for said drive means having operative portions thereof in the path of said bales moving on said loading means,
   f. said control means causing said loading means to move the leading end of a first bale into engagement with said stop,
   g. said control means also causing said loading means to stop a following bale such that the trailing end of the following bale is even with a predetermined point,
   h. a reciprocating pusher mechanism on said apparatus arranged to move said bales laterally in their loaded position from said loading means,
   i. and drive means for said pusher mechanism,
   j. whereby rows of bales made up of a first bale and a following bale as loaded provide flush ends for the stack and any excess space between bales in a row is located interiorly of the stack.
2. The bale stacking device of claim 1 wherein said loading means includes a first conveyor for moving bales toward said platform and a second conveyor arranged to receive bales from said first conveyor and to position them in said flush position at the ends of the platform.
3. The bale stacking device of claim 2 wherein said control means includes an electric circuit and a plurality of switches in said circuit actuatable by bales being loaded by said loading means, said switches controlling the operation of said conveyors for positioning said bales in said flush position at the ends of the platform.
4. The bale stacking device of claim 1 wherein said control means includes an electric circuit and a plurality of switches in said circuit actuatable by bales being loaded by said loading means, said switches being arranged to cause actuation of said drive means for the pusher mechanism at the time the leading end of a first bale is engaged against said stop and the trailing end of a following bale is flush with the other end of said platform.
5. The bale stacking device of claim 1 wherein said control means includes an electric circuit, a plurality of switches in said circuit actuatable by bales being loaded by said loading means, said loading means and said pusher mechanism being fluid operated, and a solenoid operated valve in said circuit controlling the flow of fluid to said loading means and to said drive means for the pusher mechanism, said switches controlling the operation of said solenoid operated valve for loading said bales in their selected position on said platform and thereafter causing reciprocation of said pusher.

* * * * *